Nov. 17, 1953  M. A. GOODBAR ET AL  2,659,301
PRINTING MECHANISM FOR ACCOUNTING MACHINES
Original Filed July 17, 1948

INVENTORS
MAYO A. GOODBAR
EVERETT H. PLACKE
& CARL G. FALKNER

BY

THEIR ATTORNEYS

INVENTORS
MAYO A. GOODBAR
EVERETT H. PLACKE
& CARL G. FALKNER

THEIR ATTORNEYS

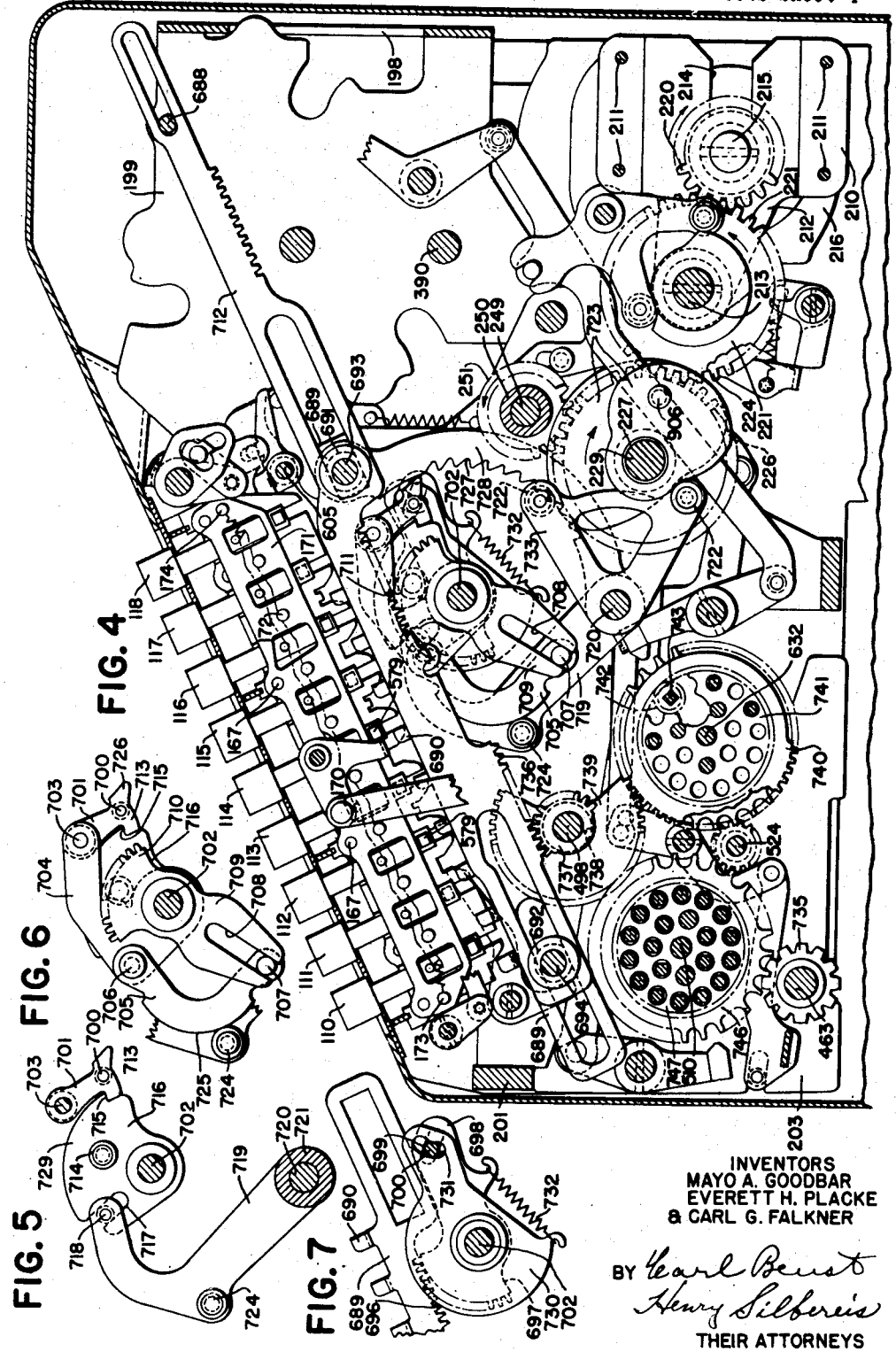

Nov. 17, 1953 M. A. GOODBAR ET AL 2,659,301
PRINTING MECHANISM FOR ACCOUNTING MACHINES
Original Filed July 17, 1948
9 Sheets-Sheet 5
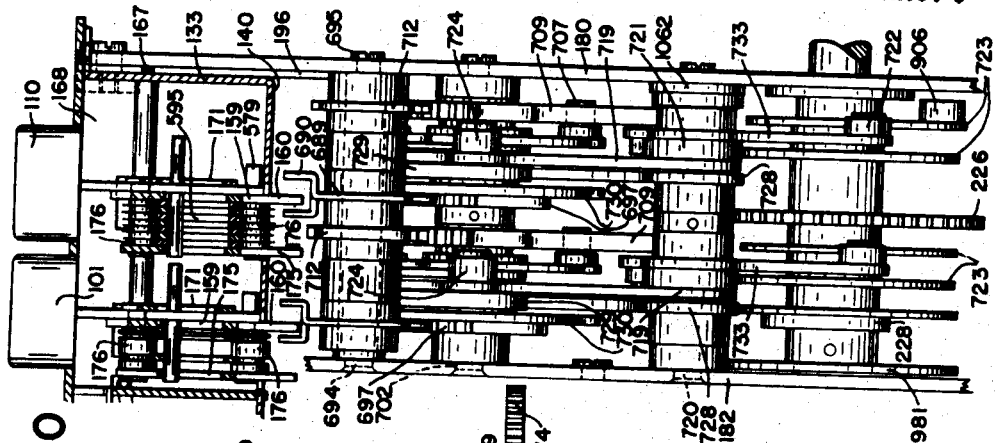
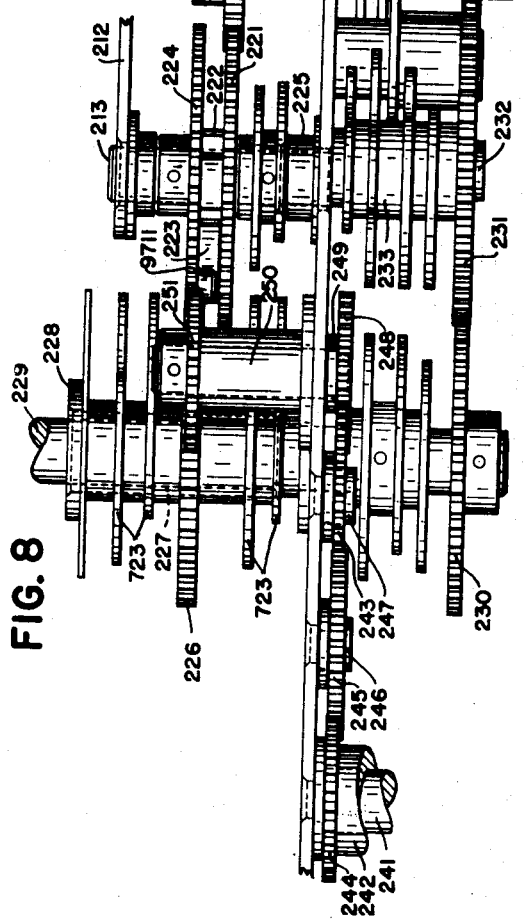
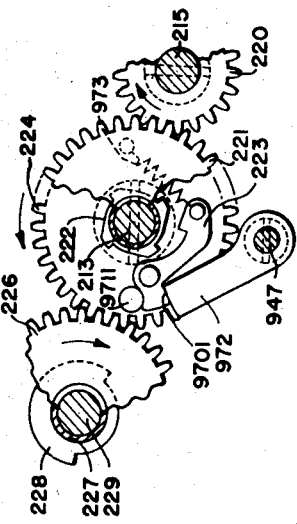
INVENTORS
MAYO A. GOODBAR
EVERETT H. PLACKE
& CARL G. FALKNER
BY
THEIR ATTORNEYS

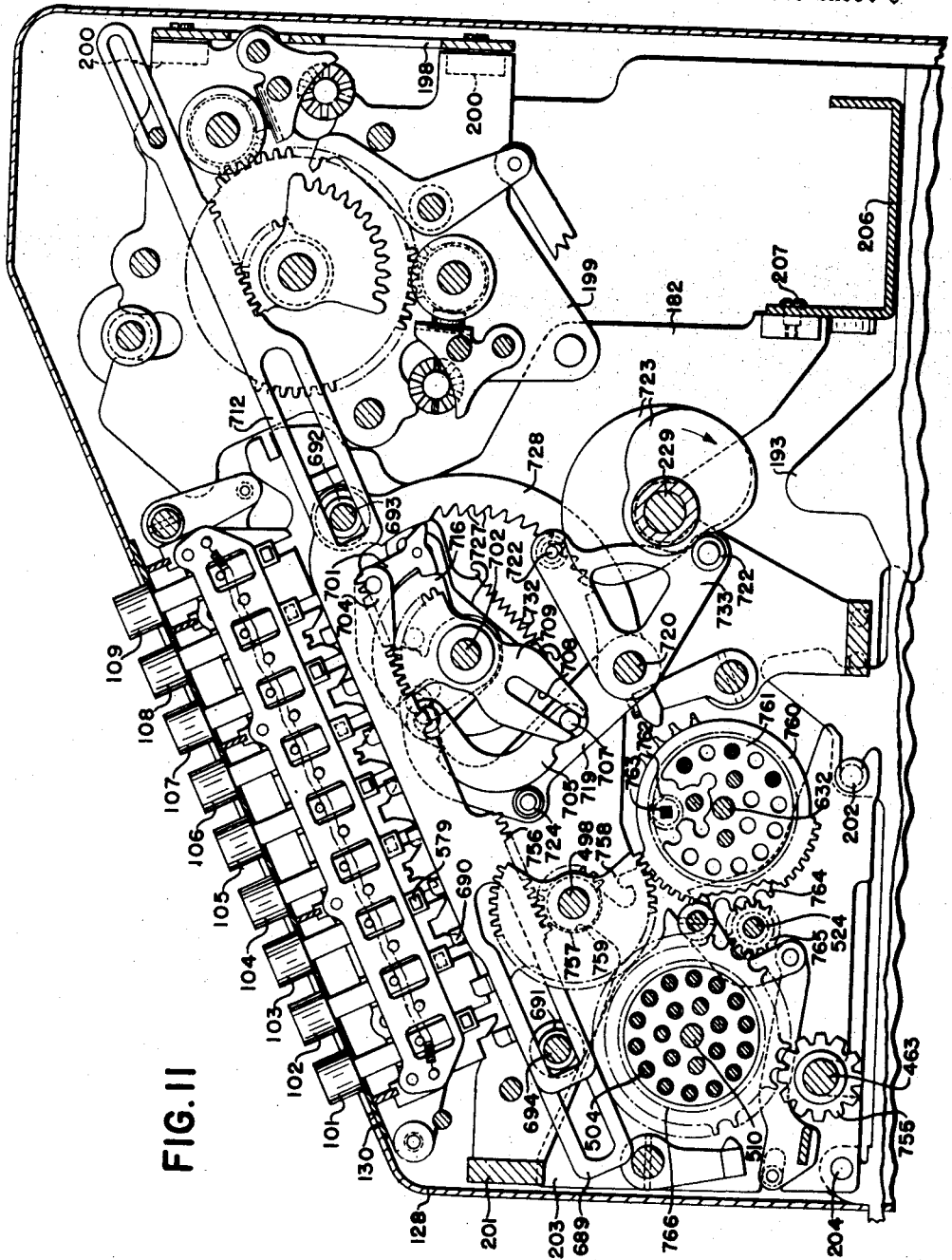

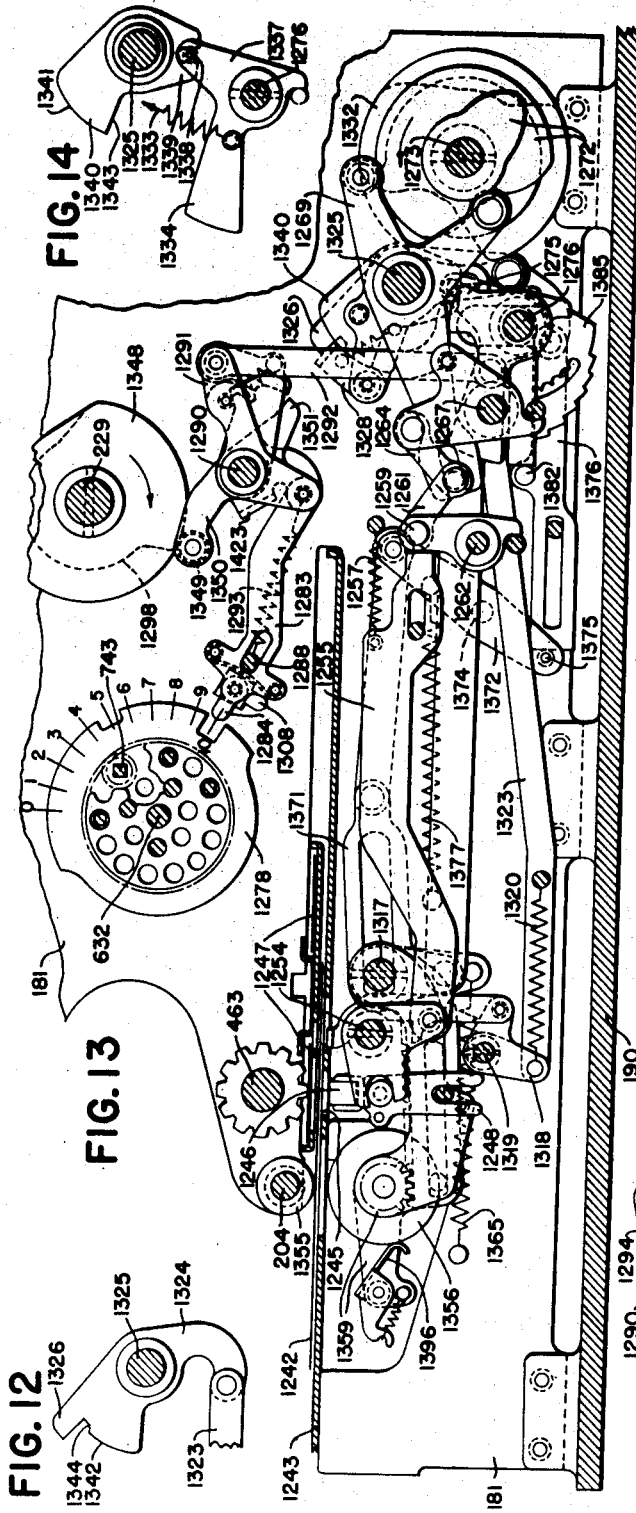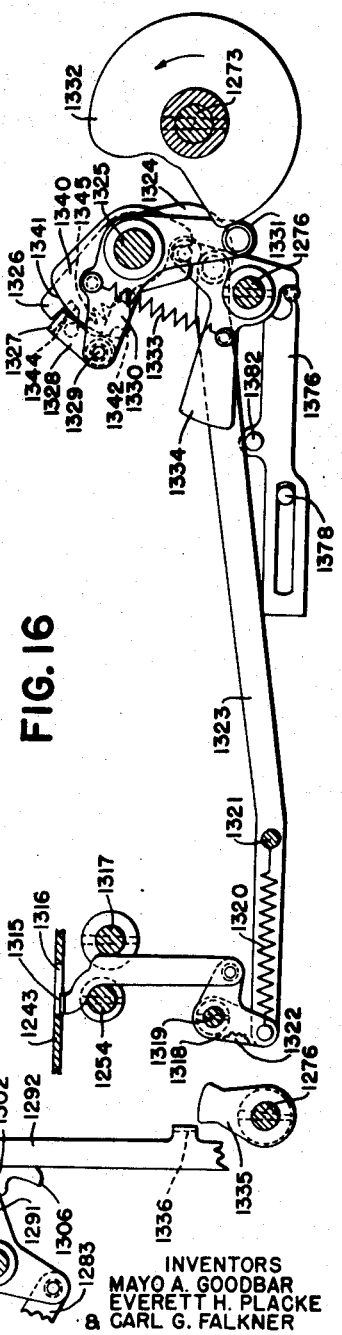

Nov. 17, 1953    M. A. GOODBAR ET AL    2,659,301
PRINTING MECHANISM FOR ACCOUNTING MACHINES
Original Filed July 17, 1948    9 Sheets-Sheet 8
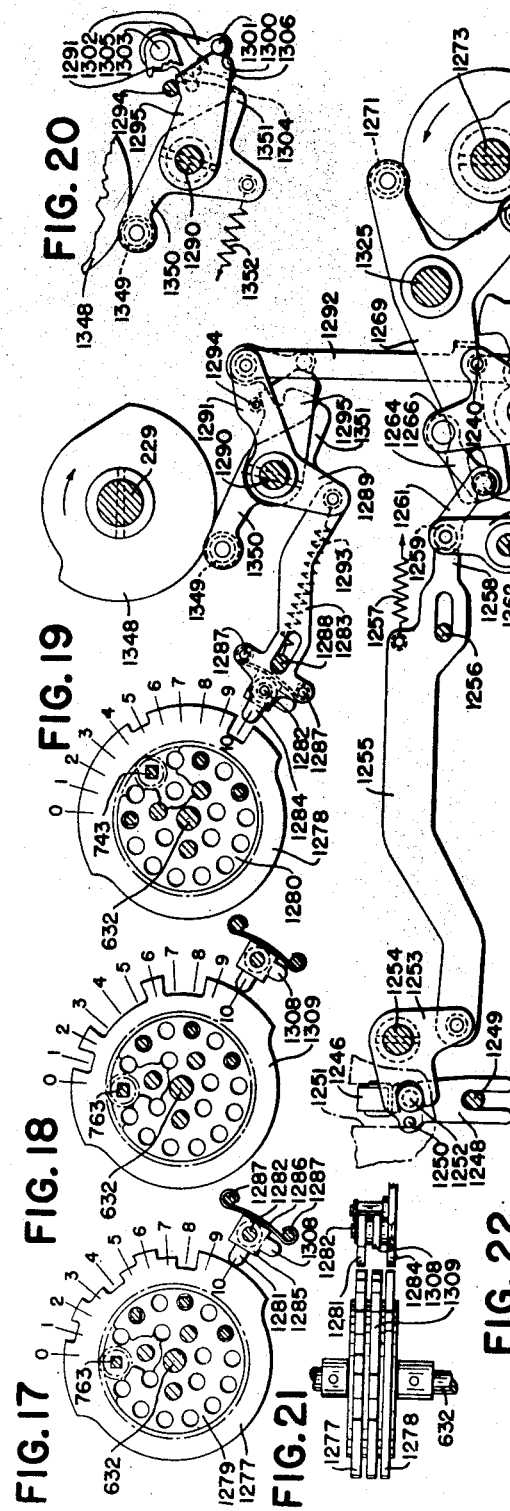
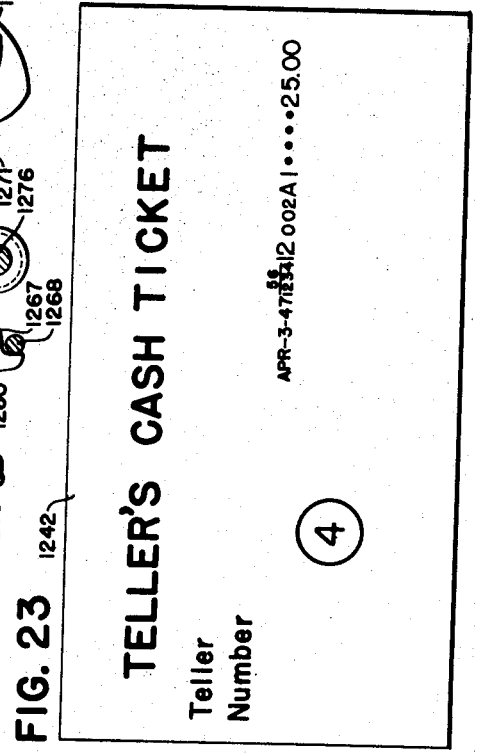
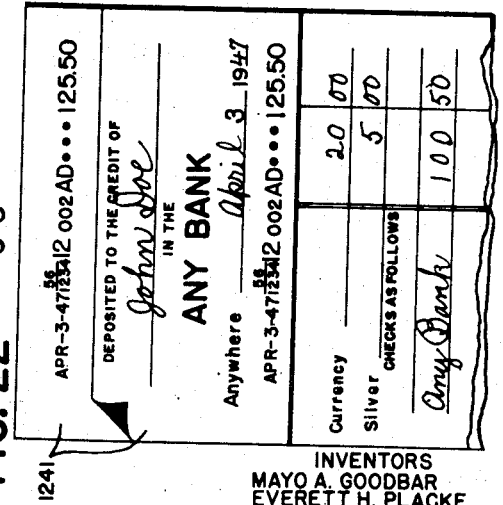
INVENTORS
MAYO A. GOODBAR
EVERETT H. PLACKE
& CARL G. FALKNER
BY Carl Berest
Henry Silbereis
THEIR ATTORNEYS

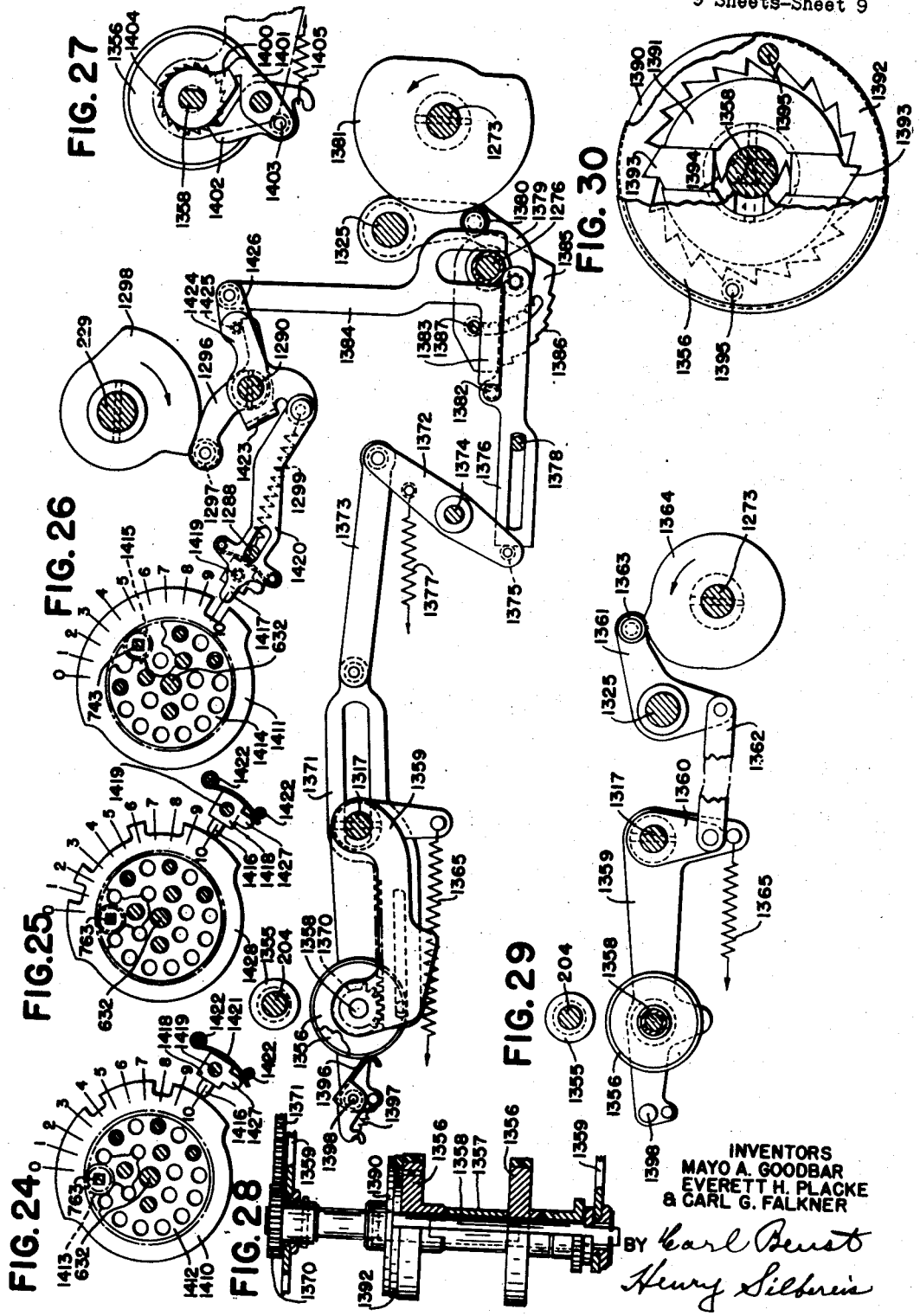

Patented Nov. 17, 1953

2,659,301

UNITED STATES PATENT OFFICE 2,659,301

PRINTING MECHANISM FOR ACCOUNTING MACHINES

Mayo A. Goodbar, Everett H. Placke, and Carl G. Falkner, Dayton, Ohio, assignors to The National Cash Register Company, Dayton, Ohio, a corporation of Maryland Original application July 17, 1948, Serial No. 39,278, now Patent No. 2,616,623, dated November 4, 1952. Divided and this application May 13, 1950, Serial No. 161,838

8 Claims. (Cl. 101—93)

This invention relates to improvements in printing mechanism for accounting machines.

This application is a division of application Serial No. 39,278, filed July 17, 1948 (now Patent No. 2,616,623, issued November 4, 1952).

One object of the invention is to provide a machine for use in handling commercial accounts by a bank teller.

Another object of the invention is to provide novel printing mechanisms to record data necessary in making a complete record of transactions by a commercial bank teller.

A specific object of the invention is to provide a novel printer mechanism having removable units which can be taken out of the printer for storing records or for supplying record material therein.

Another specific object of the invention is to provide an automatic control over the operations of a printing hammer to cause the hammer to make one or two printing strokes.

With these and incidental objects in view, the invention includes certain novel features of construction and combinations of parts, a preferred form or embodiment of which is hereinafter described with reference to the drawings which accompany and form a part of this specification.

Of said drawings:

Fig. 4 is a sectional view taken at the right of the first transaction bank, showing the transaction differential mechanism and certain mechanisms adjusted thereby.

Fig. 5 is a detail view of the driving mechanism for the first transaction bank differential mechanism.

Fig. 6 is a detail view of the beam-setting mechanism for the first transaction bank.

Fig. 7 is a detail view of certain parts of the first transaction bank differential mechanism.

Fig. 8 is a detail view of a part of the two cam lines of the machine.

Fig. 9 is a detail view of the clutch mechanism for starting the machine in operation.

Fig. 10 is a sectional view and shows the transaction bank differentials, together with the main cam line for operating the machine, looking from the front of the machine.

Fig. 11 is a sectional view taken just to the right of the second transaction bank and shows the second transaction bank differential mechanism and the connections for setting the type wheels and the control plates.

Fig. 12 is a cross-sectional view taken through the slip printer mechanism.

Fig. 13 is a detail view of a part of the slip feeler operating mechanism.

Fig. 14 is a detail view of a part of the slip printer control mechanism.

Fig. 15 is a detail view of a part of the slip feeler mechanism for controlling the slip printing and feeding mechanisms.

Fig. 16 is a detail view of the slip feeler and the actuating mechanism therefor.

Fig. 17 is a detail view of the control disc set under control of the second transaction bank of keys for controlling the operation of the printing hammer for the deposit slip printer.

Fig. 18 is a detail view of another control disc set under control of the second transaction bank of keys for controlling the operation of the printing hammer for the deposit slip printer.

Fig. 19 is a detail view showing the deposit slip printing hammer mechanism, together with the control disc set under control of the first transaction bank of keys, for controlling the hammer mechanism.

Fig. 20 is a detail view of a part of the mechanism shown in Fig. 19.

Fig. 21 is a top plan view of the control discs shown in Figs. 17, 18, and 19, together with the feeling fingers coacting therewith.

Fig. 22 is a facsimile of a deposit slip printed in the slip printing section of the machine.

Fig. 23 is a facsimile of a teller's cash ticket printed in the slip printing section of the machine.

Fig. 24 is a detail view showing one of the control discs set under control of the second bank of transaction keys for controlling the feed of the deposit slip.

Fig. 25 is a detail view of another notched disc set under control of the second bank of transaction keys for controlling the feed of the deposit slip.

Fig. 26 is a detail view showing the deposit slip feeding mechanism and a control disc set under control of the first bank of transaction keys for controlling the feeding mechanism.

Fig. 27 is a detail view showing a lock for the feed mechanism for the deposit slip.

Fig. 28 is a top plan view showing the deposit slip feeding rollers.

Fig. 29 is a side view showing the mechanism for controlling the deposit slip feed tensioning mechanism.

Fig. 30 is a detail view, shown in an enlarged scale, of the clutch mechanism for operating the deposit slip feed rollers.

GENERAL DESCRIPTION

Figure 1:
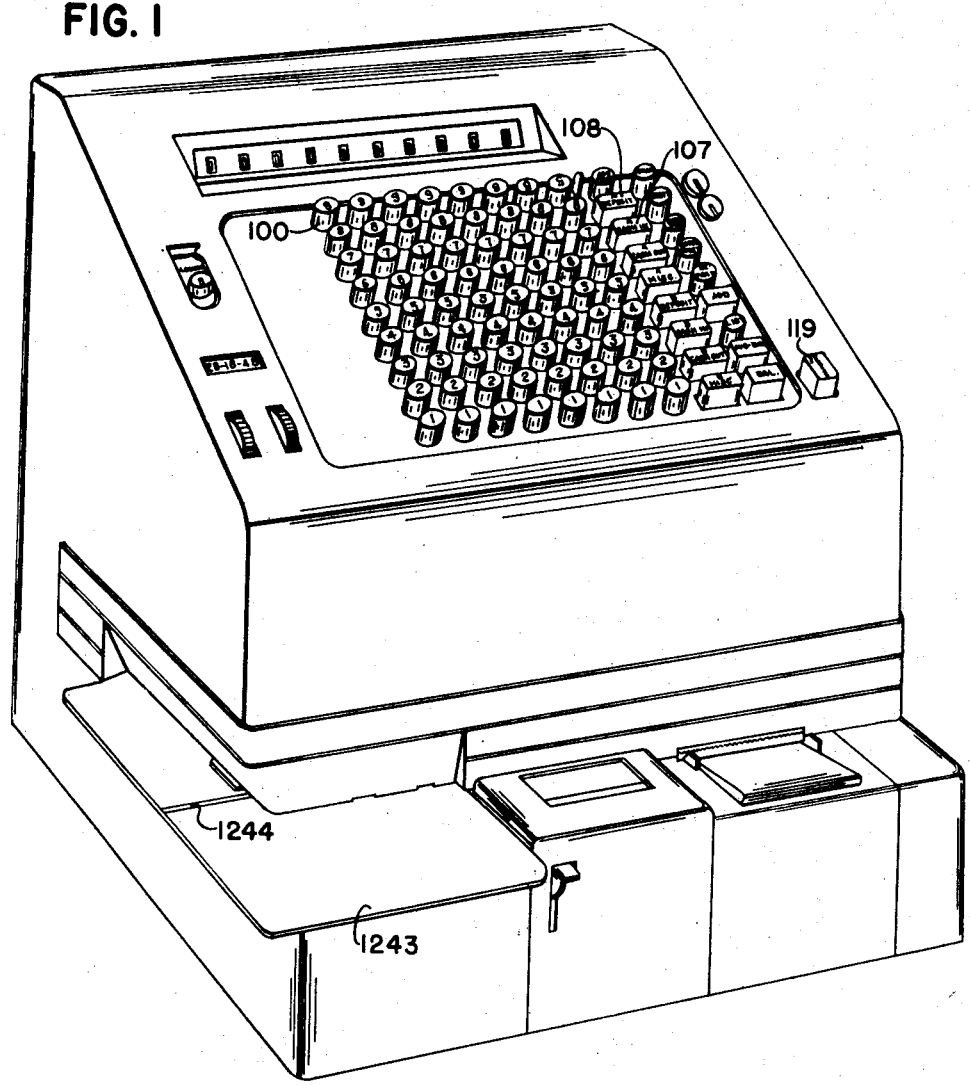
Fig. 1 is a perspective view of the machine, in which the invention is applied.

The invention illustrated herein is embodied in a machine for use by commercial bank tellers. In handling commercial account transactions, it is necessary to segregate deposits, in the form of checks, cash, and mixed checks and cash, from cash paid out transactions. In recording these commercial bank transactions, it is also necessary to enter transactions wherein a check is presented, a part of the amount of which is deposited and the balance taken in cash by the customer.

All the above transactions are recorded at the teller's window in the present machine, which simultaneously produces printed records for use by the Auditing and Bookkeeping Departments. Recording mechanisms are located at the front of the machine and include a slip printer to print on deposit slips and cash tickets, an audit tape printer, and an issuing tape printer.

The slip printer is located near the left side of the machine just below the keyboard and includes a table upon which deposit slips or cash tickets are placed. When the total deposits shown by the deposit slip are entered into the totalizers of the machine, a total is printed on the deposit slip. If duplicate deposit slips are to be used, the total is printed on each slip. In addition to the printing of the total of the deposit on the deposit slip, other data is also set up on the printing member, such as the date, the bank number, the machine number, the consecutive number, and a symbol for the transaction. An adjustable feed is provided to permit easy control over the spacing of the double impressions to accommodate various printed forms. As illustrated herein, the distance between printed impressions can be varied from .6 inch to two inches in steps of .2 inch.

The automatic printing controls over the slip printing hammer effected by each key of the two transaction banks is briefly tabulated below.

Deposit keys

Depression of either deposit key, followed by an operation of the machine, will cause a double impression to be made on the deposit slip.

Deposit keys and repeat key

If the Repeat key is depressed in combination with a deposit key, followed by an operation of the machine, a single impression is made on the deposit slip.

"Cash In" keys or "Miscellaneous" keys

Operation of the machine with a "Cash In" key or a "Miscellaneous" key depressed causes one impression to be made upon the deposit slip. These keys control the setting of symbols "AI," "BI," "AM," and "BM," respectively, at the printing line.

"Cash Out" keys

Depression of a "Cash Out" key, followed by an operation of the machine, causes the slip impression hammer to be disabled.

"Cash Out" key with "List" key

Depression of the "List" key in combination with a "Cash Out" key, followed by an operation of the machine, causes the slip impression hammer to be disabled.

Balance key

Depression of the Balance key, followed by an operation of the machine, disables the slip printing hammer.

Balance key with Add Print key

Depression of the Add Print key in combination with the Balance key, followed by an operation of the machine, causes the slip impression hammer to be disabled.

Sub-Balance key

Depression of the Sub-Balance key, followed by an operation of the machine, causes the slip impression hammer to be disabled.

Sub-Balance key with Add Print

Depression of the Add Print key in combination with the Sub-Balance key, followed by an operation of the machine, causes the slip impression hammer to be disabled.

List key

Depression of the List key, followed by an operation of the machine, exercises no control over the slip impression hammer. Any control over the printing mechanisms which are effective during an operation of the machine with the List key depressed is effected by whatever key is depressed therewith. In the system described herein, it is contemplated that a "Cash Out" key be depressed in combination with the List key.

Add key

The Add key controls the machine so that the amounts are added into the List, or visible, totalizer, and all printing is disabled during the operation in which the Add key is depressed. Thus, when the machine is operated with the Add key only depressed, the machine operates as a straight adding machine.

Add key in combination with Repeat key

Operation of the machine with the Repeat key depressed in combination with the Add key results in the operation identical with that described for the Add key except that it repeats the addition of the amount previously added.

Repeat key

The Repeat key is always used with a motorized key, and the controls effected depend on the controls of the key with which it is depressed, in the manner pointed out above.

Batch Reset key

The Batch Reset key controls the machine to clear the batch totalizer corresponding to the key depressed, and the slip impression hammer is disabled.

Batch Read key

The Batch Read key controls the machine to operate exactly like the Batch Reset key, except that a sub-total is taken and the selected totalizer is not cleared.

Reset key

The Reset key controls the machine to reset any selected totalizer on the rear totalizer line, and the slip impression hammer is disabled.

Read key

Operation of the machine with the Read key depressed results in the identical operation described with the Reset key depressed, except that a sub-total is taken and the selected totalizer is not cleared.

DETAILED DESCRIPTION

Keyboard

Figure 2:
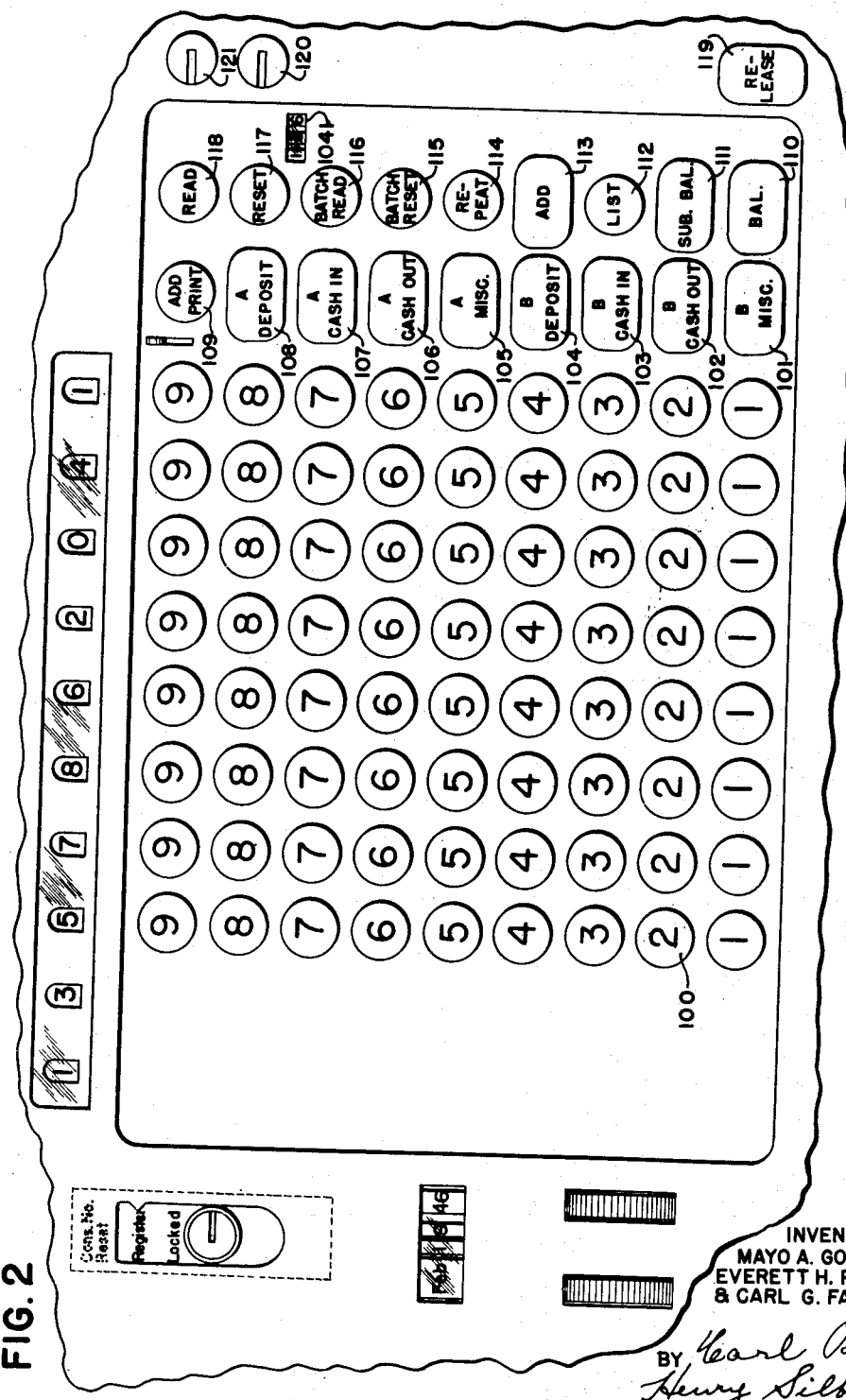
Fig. 2 is a diagrammatic view of the keyboard.

As shown in Figs. 1 and 2, the keyboard of the machine, as illustrated herein, is provided with eight rows of amount keys 100 and two banks of control, or transaction, keys 101 to 118 inclusive. The keys 101 to 118 inclusive are provided with legends to aid in their selection for controlling the machine in its operations. In addition to the controls indicated by the legends thereon, keys 101 to 108 inclusive, 110, 111, and 113 are what is known in the art as motor keys; that is, in addition to controlling the machine in accordance with the legends thereon, these keys also release the machine for operation. Keys 109, 112, and 114 to 118 inclusive do not release the machine for operation, and therefore they must be depressed in combination with one of the motor keys. Near the lower right-hand corner of the keyboard is a release key 119, which is used to release the keys on the keyboard if for any reason it is desired to release them after they have been depressed and before the machine has been released for operation. The reset key 117 is provided with a lock 120, whereby the teller may lock the reset key during his absence. A similar lock 121 is provided for the read key 118.

The amount keys 100 and the control keys 101 to 118 inclusive are mounted in a frame which consists of a unit which may be removed from the machine in its entirety. This unit construction provides an economical and convenient production method, since the keyboard can be assembled separately and then assembled into the machine as a separate entity.

MAIN FRAMEWORK

Figure 3:
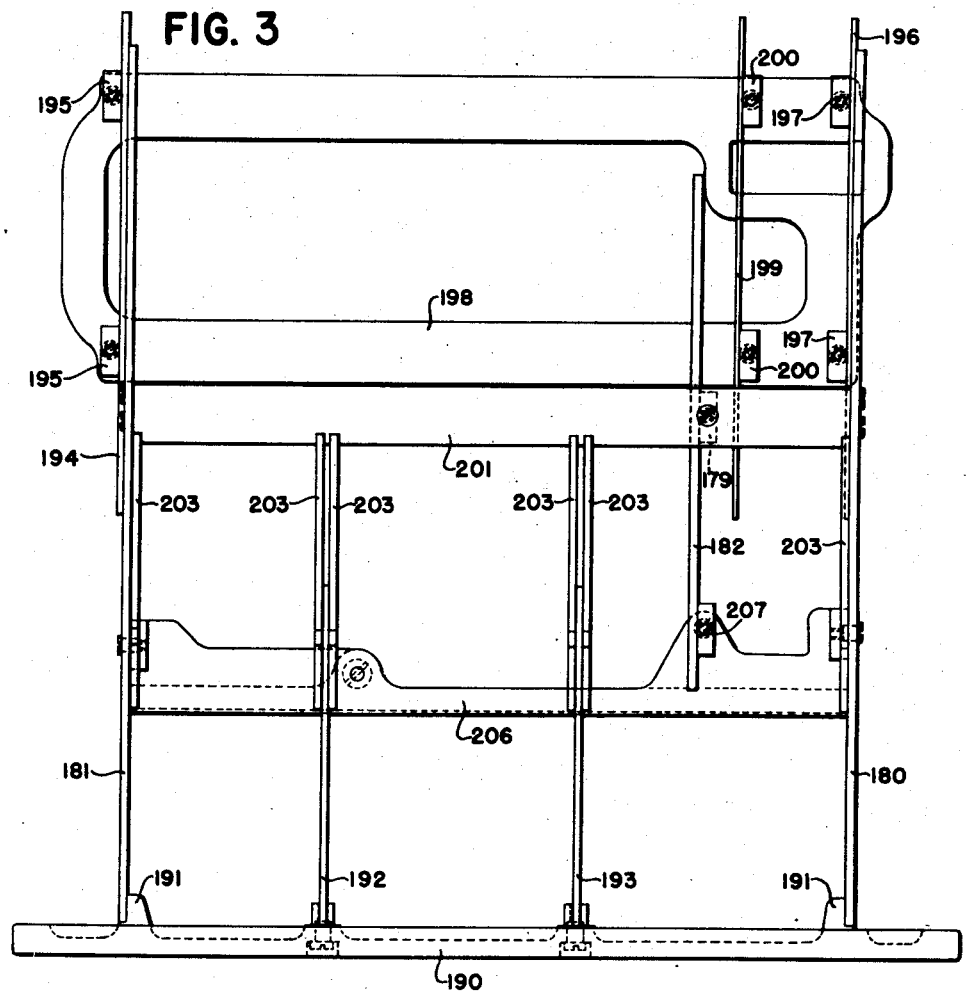
Fig. 3 is a detail view showing the main framework of the machine as viewed from the front of the machine.

Fig. 3 illustrates the main frames of the machine. The left side frame 181 and the right side frame 180 are mounted on a base 190 having lugs 191 thereon. Located intermediate the frames 180 and 181 are a left printer frame 192 and a right printer frame 193 suitably secured to lugs on the base 190. Secured to the left side frame 181 is an auxiliary frame 194, which is provided with two blocks 195. Secured to the right side frame 180 is an auxiliary frame 196, provided with blocks 197. The blocks 195 and 197 are tapped to receive screws projecting through a back frame 198. Another auxiliary frame 199 is provided with blocks 200 threaded to receive screws passing through the back frame 198, by means of which the auxiliary frames 199 are supported on the back frame 198. A shouldered stud 202 (Fig. 11) is provided on each side of the printer frames 192 and 193, on one side of the left side frame 181, and on one side of the right side frame 180. Near the front of the machine, a series of six auxiliary plates 203 (Figs. 3, 4, and 11) for supporting the type carrier and the setting mechanism are provided. Each auxiliary plate 203 has, on its lower rear end, a slot which is adapted to straddle the small diameter of a shouldered stud 202 when the type carrier unit, which unit is separately assembled, is inserted into the machine. A cross bar 201 is provided with a series of six notches, into which the upper edge of each plate 203, as best shown in Fig. 11, is inserted. After the type carrier unit has been separately assembled, in the manner described hereinafter, the entire unit is placed in the machine by inserting the notches of the auxiliary plates 203 over the small diameters of the shouldered studs 202, sliding the upper edges of the auxiliary plates 203 into the notches in the cross bar 201, and inserting a shaft 204 (Fig. 11) through the right side frame 180, through all of the auxiliary plates 203, through the printer frames 192 and 193, and finally through the left side frame 181. Near the rear of the machine, a cross bar in the shape of a formed channel 206 (Figs. 3 and 11) is mounted between the side frames 180 and 181. The auxiliary frame 182 is formed at its rear end with a flatted surface, to which is welded a threaded block to receive a screw 207 to form a support for the auxiliary frame 182. Near the rear of the machine, at its right, a bracket 210 (Fig. 4) is secured to the right side frame 180 by means of four screws 211. The bracket 210 is provided with a forwardly-extending ear 212 to support a cam shaft 213, forming one of the main shafts for driving the mechanism of the machine. The bracket 210 is also provided with a slot 214 for supporting the shaft 215 of an electric motor 216, which motor is one means for operating the machine. The motor 216 is carried by the cross bar 206 (Figs. 3 and 11).

MACHINE DRIVING MECHANISM

The machine may be operated by an electric motor or by a hand crank. The motor shaft 215 (Fig. 4) has secured thereon a gear 220, which meshes with a gear 221 (Figs. 4, 8, and 9), loosely mounted on the cam shaft 213. Secured to the gear 221 is a clutch member 222, with which a clutch pawl 223 engages when the machine is released for operation. The machine is released for operation by depression of a release key 101 to 108, 110, 111, or 113. Depression of any one of these keys releases a shaft 946 to rock an arm 972 from a surface 9701 of the clutch pawl 223, whereupon a spring 973 rocks the clutch pawl 223 into engagement with the clutch member 222. A stud 9711 on a gear 224 normally maintains the pawl in disengaged position. The means for controlling the rocking movement of the shaft 947 is fully disclosed in the parent case. The clutch pawl 223 is pivotally mounted on the gear 224 secured to the shaft 213. The shaft 213 (Fig. 8) is supported at one end by the ear 212, on the motor bracket 210, and at the other end by a bearing 225 in the right side frame 180. Also meshing with the gear 224 is a gear 226, secured to a sleeve 227, which is mounted to rotate on a cam shaft 229 and upon which are mounted two pairs of cams 723 for operating the first and second transaction differential mechanisms. Also secured on the sleeve 227 is a clutch member 228 (see Figs. 8 and 9), which is controlled to operate the cam shaft 229 selectively in accordance with certain types of operation of the machine. The shaft 229 also has fast thereon a gear 230 (Fig. 8). The gear 230 meshes with a gear 231 mounted on a sleeve 233, mounted to rotate on a stud 232 carried by the right side frame 180. The gear 231 meshes with an intermediate gear 879, which also meshes with a gear 1274 secured to the printer operating cam shaft 1273 (Fig. 12).

If desired, the machine may be operated by a hand crank, which is slidably mounted on a stud 241 (Fig. 8) on the right side frame 180. When it is desired to operate the machine by the hand crank, the handle is slid endwise on the stud 241 to engage it with a hub 242, also rotatably mounted on the stud 241. Secured to the hub 242 is a gear 244, meshing with an intermediate pinion 245, rotatably mounted on a stud 246 on the right side frame 180. Meshing with the pinion 245 is a gear 243 rotatably mounted on a stud 247 supported in the right side frame 180. Meshing with the gear 243 is a gear 248 secured to the end of a shaft 249 rotatably mounted in a bearing 250 carried by the right side frame 180. Also on the shaft 249 is a gear 251 (Figs. 4 and 8) meshing with the beforementioned gear 226 (see also Fig. 9).

Rotation of the hand crank, through the train of gears 244, 245, 243, and 248, the shaft 249, and the gear 251, rotates the gear 226 in the same manner as described in the description of these connections as driven by the motor shaft 215. In a hand operation, the clutch pawl 223 ratchets idly over the ratchet teeth of the clutch member 222.

AMOUNT KEY BANKS

Each bank of amount keys includes a full complement of nine keys 100 (Fig. 1), and each bank of amount keys controls the setting of digits on type wheels at the printing line through connections including a shaft 504 (Fig. 11). The said connections are fully described in the above-mentioned parent case.

TRANSACTION KEYS

The transaction keys for controlling the various functions of the machine are arranged in two banks, as shown in Fig. 2. The keys 101 to 109 inclusive control the selection of totalizers into which amounts are to be added, as fully explained in the above-mentioned parent case, in addition to controlling certain operations in the printer section of the machine in the manner described hereinafter. This bank of keys will be referred to herein as the second transaction bank.

The keys 110 to 118 inclusive control the time and the manner of operation of the totalizer engaging and disengaging mechanism, as fully explained in the above-mentioned parent case, together with controlling certain functions of the printing mechanism described hereinafter. The bank of keys 110 to 118 will be hereinafter referred to as the first transaction bank.

TRANSACTION BANK DIFFERENTIAL MECHANISMS

The depressed keys in the first and second transaction banks control the differential movement of actuators which control the various functions of the machine. Inasmuch as both differential mechanisms are alike, only one will be described herein in detail. Figs. 3 to 7 inclusive and 10 will be referred to in the description of the transaction bank differential mechanism. Figs. 3 to 7 inclusive illustrate the differential mechanism for the first transaction bank.

First transaction bank differential mechanism

Coacting with studs 579 of the keys 110 to 118 inclusive is a differentially settable slide 689 (Figs. 4, 7, and 10). The studs 579 on the transaction keys alternately project to the right and left (Fig. 10) into the path of alternately-arranged ears 690 formed on the slide 689. The relationship between the studs 579 and the ears 690 is such that, on operation of the machine with a key depressed, the slide 689 is arrested in a position commensurate with the position of the depressed key. The slide 689 is slotted at its front and rear ends to be supported by, and slide on, collars 691 and 692 carried by studs 693 and 694, respectively. The studs 693 and 694 are riveted on the frame 182 (Fig. 10) and are provided with tenons projecting into the side frame 180, and a screw 695, entering a tapped hole in each stud 693 and 694, maintains the frame 180 in proper relationship with the studs 693 and 694. Suitable spacing collars are provided to properly space the slide 689 on the studs 693 and 694, as clearly shown in Fig. 10.

The slide 689 is provided with teeth 696 (Fig. 7) meshing with a segment 697 of an arm 698 having a slot 699, into which projects a stud 700 of a latch 701 (Figs. 5 and 6). The arm 698 is rotatably mounted on a stud 702 carried by the frame 182 and by the side frame 180. The latch 701 is pivotally mounted on a stud 703 carried by an arm 704 also pivotally supported on the stud 702. A beam 705 is pivotally mounted on the arm 704 by a stud 706. The free end of the beam 705 is provided with a stud 707, which projects into a slot 708 of an arm 709, also pivoted on the stud 702. The arm 709 is provided with a segment 710, meshing with teeth 711 (Fig. 4) of a type setting control slide 712. The control slide 712 is slidably mounted on the aforesaid collars 691 and 692, and at its upper end by a stud 688 mounted between the frames 198 and 199 (Fig. 3).

The latch 701 (Figs. 5 and 6) is provided with a toe 713 normally engaging with a notch 715 of a differential driver 716. The differential driver 716 is pivoted on the stud 702 and is provided with a notch 717, into which projects a stud 718 on the free end of a lever 719 pivoted on a stud 720 carried by the frames 180 and 182. The lever 719 is secured to an arm 733 (Fig. 4) by a hub 721. The arm 733 is provided with a pair of rollers 722, which coact with the pair of cam plates 723 (Figs. 4 and 10) secured to, so as to be rotatable by, the aforementioned sleeve 227 (Figs. 8, 9, and 10). The lever 719 (Figs. 5 and 6) is provided with a roller 724, which is movable into engagement with a surface 725 of the beam 705 in a manner to be described presently.

When the cam plates 723 are rotated, upon rotation of the sleeve 227, the arm 733 is rocked clockwise (Fig. 4) to rock the lever 719 clockwise. Clockwise movement of the lever 719, through the stud 718 and the notch 717, rocks the differential driver 716 also clockwise. Clockwise movement of the driver 716 carries with it the latch 701 and, through the stud 700, rocks the arm 698 (Fig. 7) clockwise. Clockwise movement of the arm 698, by the segment 697, moves the slide 689 to the right (Fig. 4) until one of the ears 690 thereon comes into contact with the stud 579 of a depressed key. This arrests the slide 689 in a position commensurate with the depressed key and at the same time positions the arm 698 (Fig. 7) in a corresponding position. Arresting of the arm 698, through its cam slot 699 acting on the stud 700, cams the latch 701 counter-clockwise around its stud 703, thus withdrawing the toe 713 from the notch 715 to arrest further movement of the arm 704. Counter-clockwise movement of the latch 701 (Fig. 6) cams an ear 726 thereon into a corresponding notch 727 (Fig. 4)

of a locking plate 728 supported by the studs 693 and 720. Continued movement of the driver 716, after the latch 701 has been disengaged therefrom, moves a concentric surface 729 (Fig. 5) thereof beneath the toe 713 and positively locks the latch 701 and the arm 704 in adjusted position, with the result that the stud 706 for the beam 705 is also locked in an adjusted position corresponding to the depressed key.

During the clockwise rocking movement of the lever 719, the roller 724 thereon comes into engagement with the surface 725 of the beam 705 and rocks the beam 705 around the stud 706 as a center. Movement of the beam 705 around the stud 706 cams the stud 707 on the lower end thereof into the slot 708 and rocks the arm 709 and the segment 710 into a position corresponding to the position in which the arm 704 has been adjusted and locked by the latch 701. This adjustment of the segment 710, through the teeth 711 on the slide 712, positions the slide 712 corresponding to the adjusted position of the differential slide 689.

After the control slide 712 has been positioned by the beam 705 in the manner just described, the cams 723 return the levers 719 counter-clockwise to restore the differential driver 716 into its home position. During this counter-clockwise movement of the driver 716, when the notch 715 again comes beneath the toe 713, the toe 713 drops behind the notch 715, and, upon continued clockwise movement, the driver 716, acting through a roller 714 thereon, engages the arm 704 and restores the arm 704 and the latch 701 to their home positions. During this movement, the segment 710 and the control slide 712 are held in their adjusted positions by means described hereinafter, and therefore the beam 705 pivots around the stud 707. The segment 710 remains in the adjusted position until readjusted during the next succeeding cycle of operation.

A counterbalancing plate 730 (Fig. 7) is pivotally mounted on the stud 702 adjacent the slide 698 and has a slot 731, through which the stud 700 on the latch 701 projects. A spring 732, stretched between the counterbalancing plate 730 and the arm 698, normally maintains the parts in the positions shown in Fig. 7. If, during the operation of the machine, the latch 701 has a tendency to withdraw prematurely from the notch 715 due to centrifugal force, the plate 730 prevents such movement. When the arm 698 is positively arrested, upon an ear 690 on the slide 689 coming into contact with the stud 679 of a depressed key, the stud 700, operating in the cam slot 699, rocks the latch 701 counter-clockwise in the manner described above. Counter-clockwise movement of the latch 701 moves the stud 700 thereon in the cam slot 731 to rock the counterbalancing plate 730 clockwise against the action of the spring 732. Since it is necessary to stretch the spring 732 to move the stud 700 in the cam slot 699, the spring 732 and the plate 730 act to prevent premature disengagement of the latch 701 from its driver 716.

*Second transaction bank differential mechanism*

The differential mechanism for the second transaction bank is identical with the differential mechanism just described for the first transaction bank, and, therefore, the same reference numerals are applied in Fig. 11. The description of the first transaction bank differential mechanism applies to the second transaction bank differential mechanism.

*First transaction bank type wheel setting mechanism*

Two type wheels 735 (Fig. 4) are provided to print symbols on the audit tape, and on the issuing strip (not shown herein), indicating the kind of operation being performed. The control slide 712 controls the positioning of the type wheels 735 mounted on the shafts 463 in the audit tape printing section and in the issuing strip printing section. No type wheel 735 is provided in the slip printing section.

Formed on the underneath side of the control slide 712 are teeth 736 (Fig. 4), which mesh with a segment 737 rotatable on a shaft 498. Connected to the segment 737 by a hub 738 is a segment 739, which meshes with a ring gear 740 on a disc 741 carried by a shaft 632. A pinion 742 meshes with the inner teeth of the ring gear 740 and is mounted on a square shaft 743 extending between the side frames 180 and 181.

Also connected to the square shaft 743, so as to be driven by the first transaction bank differential mechanism, are a series of control discs for controlling the printing operations, in a manner described hereinafter.

*Second transaction bank type wheel setting mechanism*

The control slide 712 (Fig. 11) for the second transaction bank controls the setting of a symbol-printing type element 755 in each of the three groups of type elements. The symbol-printing type wheel 755, in each group of type wheels, lies adjacent the highest amount type wheel.

Formed on the under side of the control slide 712 (Fig. 11) are a series of teeth 756, meshing with a pinion 757, which is connected to a segment 758 by a sleeve 759. The segment 758 meshes with a ring gear 760 carried by a disc 761 mounted on the shaft 632. The ring gear 760 has inner teeth meshing with a pinion 762 carried by a square shaft 763. Also carried by the square shaft 763 are pinions, similar to the pinion 762, adjacent each one of the three ring gears 764, one being provided for each group of type wheels. Meshing with each ring gear 764 is an intermediate pinion 765 on the shaft 524. Meshing with each intermediate pinion 765 on the shaft 524 is a ring gear 766, meshing with the respective type wheels 755. Through the connections just described, the setting of the control slide 712 adjusts the type carrier 755 into a position corresponding to the position to which the control slide 712 is adjusted by the differential mechanism under the control of the depressed keys 101 to 108 of the second transaction bank to set a symbol at the printing line to identify the key which was depressed, and, through connections later described, sets certain control discs for controlling the operation of the printing mechanism in the slip printer.

*Insertable slip printer*

In the herein-illustrated system for a commercial bank teller, the machine is adapted to print on insertable slips, such as a deposit slip (Fig. 22) and a teller's cash ticket (Fig. 23). The data to be printed includes the date, the bank number, the machine number, a consecutive number, a symbol for the teller, a symbol representing the kind of entry, and the amount of the deposit. The printing mechanism for printing on the insertable slip is located at the lower left-hand corner of the machine, as viewed in Fig. 1.

In commercial accounts, the deposit being made by the customer may consist of all checks, all cash, or mixed deposits including both checks and cash. In order to assist the Auditing Department to audit the teller's cash balance, it is usually the practice for the teller to fill in a cash ticket, indicating the amount of cash taken in on any deposit, whether it is a straight cash deposit or a mixed cash and checks deposit. When a deposit including both checks and cash is made, the machine disclosed herein prints the total of the deposit on the deposit slip and the amount of cash included in the deposit on the cash ticket. One copy of the deposit slip and the cash ticket are sent to the Auditing Department with the checks. In auditing the individual transaction, the auditor first enters the total amount of the deposit on a bank proof machine and then subtracts the amount read from the cash ticket, then the amount of each check involved in the particular deposit. If the transaction is complete in all respects, the bank proof machine indicates a clear balance.

The deposit slip is prepared in duplicate, so that the teller can give one copy to the customer and send the other copy to the Auditing Department. The deposit slip also provides means for properly crediting the customer's account with the total amount thereof, after it is properly proved out in the bank proof machine.

In addition to proving the correctness of the entries of the items on the deposit slip, the teller's cash ticket also provides a means for balancing the cash in a teller's cage. At the end of the day's business, the auditor totals all of the cash tickets for a given teller, which gives him a total of the amount of cash taken in by the teller. The audit strip, to be described presently, furnishes a total of the amount of cash which the teller pays out. The difference between the amount of cash taken in and the amount of cash paid out gives the auditor the balance which the teller should have in his cage.

As illustrated herein, the miscellaneous keys in the second transaction bank also control a slip impression means to make one impression on an insertable slip. The form of slip used for this purpose depends upon the nature of the use to which the miscellaneous key is put.

Insertable slip printing mechanism

The deposit slip 1241 (Fig. 22) or the cash ticket 1242 (Fig. 23) is positioned on a slip table 1243 (Figs. 1 and 12) supported on the frames 181 and 192 (Fig. 4). Guide lines 1244 (Fig. 1) are engraved on the slip table to guide the teller in positioning the slip on the slip table 1243 in the proper relationship with the printing wheels in the slip printing section. All of the slip printing mechanism is located between the frames 181 and 192 (Fig. 3), and the slip table 1243 is provided with an opening 1245, through which a printing hammer 1246 is moved to carry the inserted slip 1241 or the cash ticket 1242 and a ribbon 1247 against the type wheels to make an impression. The printing hammer 1246 is carried by a support 1248 (Fig. 19) guided on a stud 1249 carried by the frame 192 and a similar stud 1249 carried by the frame 181. Each end of the supporting member 1248 is provided with a stud 1250, which projects into a notch 1251 formed in each of the side frames 181 and 192.

The studs 1249 and 1250, therefore, provide a means for guiding the printing platen in its vertical or up-and-down printing movements.

Mounted on each end of the supporting member 1248 is a stud 1252 (Fig. 19), which are engaged by the bifurcated ends of bell cranks 1253 secured to a shaft 1254 pivotally supported in the frames 181 and 192. Connected to the bell crank 1253, adjacent the frame 192, is a link 1255, the right-hand end of which is slotted to engage over a stud 1256 to guide the link 1255 in its movements. A spring 1257, connected to the link 1255 and a suitable stud on the frame 192, normally maintains the hammer in its lower position, the stud 1256 acting as a stop for the link 1255 when held in its normal position, shown in Fig. 19. The right-hand end 1258 of the link 1255 is offset into the plane of a stud 1259, which acts as a pivot between an arm 1260 and a toggle link 1261. The stud 1259 is shouldered to provide space between the link 1261 and the arm 1260, into which space the end 1258 of the link projects. The arm 1260 is mounted on a stud 1262, carried by the frame 192. A stud 1263 on the frame 192 acts as a limiting stop for the arm 1260. A second toggle link 1264 is connected to the toggle link 1261 by a stud 1265, and the opposite end of the toggle link 1264 is pivoted to an arm 1266, pivoted on a stud 1267 carried by the frame 192. A stud 1268 on the frame 192 acts as a limiting stop for the arm 1266 when in its home position. The stud 1265 projects laterally from the link 1264 and into a bifurcated end of a cam arm 1269, pivoted on a shaft 1325 carried by the frames 181, 192, 193, and 180.

The cam arm 1269 is provided with two anti-friction rollers 1271, which are acted upon by a pair of cams 1272 secured on the printer shaft 1273.

The printer cam shaft 1273 is rotated from the main cam shaft 229 (Fig. 8) by the train of gears including the gears 230, 231, and 879, above mentioned. Meshing with the gear 879 is the gear 1274, secured to the printer cam shaft 1273. The ratio of the train of gears 230, 231, 879, and 1274 is such that one complete rotation of the main cam shaft 229 rotates the printer cam shaft 1273 one complete rotation.

Counter-clockwise rotation of the cams 1272 rocks the cam arm 1269 first clockwise and then counter-clockwise, back to its home position. Clockwise movement of the cam arm 1269, acting on the toggle stud 1265, tends to straighten the toggle composed of links 1261 and 1264. If the arm 1266 is held against clockwise rotation, the toggle is straightened and the arm 1260 is rocked counter-clockwise. Counter-clockwise movement of the arm 1260 moves the link 1255 toward the left (Fig. 19) to rock the bell cranks 1253 clockwise, which, through the studs 1252, raises the printing hammer 1246 to take an impression from the type wheels onto the inserted slip.

The extent of rocking movement of the arm 1269 is such that the toggle links 1261 and 1264 are moved into a horizontal position and beyond to again break the toggle joint. Therefore, when the arm 1269 is restored in a counter-clockwise direction, the toggle links 1261 and 1264 are straightened before they are broken, upon their return to their normal position. This movement is taken advantage of in controlling the printing hammer for making one or two impressions. The first impression is made when the toggle is straightened during the clockwise movement of the cam arm 1269, and the second impression is made when the cam arm 1269 is returned counter-clockwise to its home position.

Whether the platen is operated to make one impression, two impressions, or no impression at all depends upon whether or not the arm 1266 is blocked against clockwise movement. The blocking of the arm 1266 is effected by a segment 1275, pivoted on a shaft 1276, carried by the frames 181 and 192. If the segment 1275 is rocked counter-clockwise before the cam arm 1269 is rocked clockwise, the segment 1275 moves under a stud 1240 on the arm 1266. If the segment 1275 is held under the stud 1240 during both the clockwise and counter-clockwise movements of the cam arm 1269, two impressions will be made. If only one impression is to be made, the segment 1275 is withdrawn from beneath the stud 1240 prior to the counter-clockwise return movement of the cam arm 1269. If, on the other hand, no impression at all is to be made during the machine operation, the segment 1275 is controlled to remain in the position shown in Fig. 19, and therefore no impression will be made during either the clockwise movement or the counter-clockwise movement of the cam arm 1269.

The selective movement of the segment 1275 is controlled by notched discs 1277 (Fig. 17) and 1278 (Fig. 19). The notched disc 1277 is adjusted under control of the second transaction bank through the square shaft 763, which shaft is rotated in a manner hereinbefore described for the setting of the type carriers 755. The notched disc 1277 is mounted on a disc 1279 and is provided with internal teeth meshing with a pinion on the square shaft 763, and the disc 1279 is mounted on the shaft 632.

The notched disc 1278 is provided with internal teeth mounted on a disc 1280, carried by the shaft 632, and said internal teeth mesh with a pinion on the square shaft 743, which shaft, as hereinbefore described, is adjusted under control of the first transaction bank of keys.

The discs 1277 and 1278 are provided with notches, some of which are deeper than others. Coacting with the periphery of the notched discs 1277 and 1278 is a feeler mechanism comprising a finger 1281 in the plane of the disc 1277, carried by an adjustable block 1285, rotatably mounted on a stud 1282, carried by a feeler link 1283. The feeler link 1283 is provided with a finger 1284 in the plane of the disc 1278. The block 1285 is rotatable on the stud 1282 to vary the control over the printing hammers in a manner to be described hereinafter. A spring plate 1286, carried on studs 1287 on the link 1283, provides a means for maintaining the block 1285 in its adjusted position.

The link 1283 is slotted to slide on a stud 1288 at its left hand end and is pivoted on an arm 1289 at its right-hand end. The arm 1289 is pivotally mounted on a shaft 1290, and a rearwardly-extending arm 1291 of the arm 1289 has pivoted thereto a link 1292, the lower end of which is pivoted to the segment 1275. A spring 1293, one end of which is connected to the stud 1288, and the other end of which is connected to the pivot stud on the arm 1289, maintains the arm 1289, the link 1292, and the segment 1275 in their normal ineffective positions. In the normal position of the arm 1291, a stud 1294 thereon rests on a shoulder of an arm 1295, secured to the shaft 1290. Also secured to the shaft 1290 is a cam arm 1296 (see also Fig. 26). The cam arm 1296 is provided with an anti-friction roller 1297, normally held against a cam 1298 on the main cam shaft 229 by a spring 1299 (Fig. 26), acting through a yoke 1423 and a stud 1425, described later.

When, during the operation of the main cam shaft 229, the outer periphery of the cam 1298 moves beyond the roller 1297, the spring 1299 rocks the arm 1296 clockwise to rock the shaft 1290 and to thereby lower the arm 1295 (Figs. 19 and 20), thus permitting the spring 1293 to move the arm 1291 and the link 1292, together with the segment 1275, to move the latter beneath the stud 1240, if permitted to do so by notches in the discs 1277 and 1278.

If, when the arm 1291 starts to rock clockwise under control of the cam 1298, the fingers 1284 and 1281 contact the outer periphery of the control discs 1277 or 1278, the feeler link is immediately arrested, thus preventing the arm 1291 from moving clockwise, thereby holding the link 1292 in its normal position to thereby prevent the segment 1275 from moving beneath the stud 1240. Under this condition, no impression is made when the cam arm 1269 later moves the stud 1265. The resistance met by the stud 1259, due to the spring 1257 and the weight of the parts, including the link 1255, the bell crank 1253, and the hammer 1246, prevents the arm 1260 from rocking counter-clockwise. This causes the arm 1266 to rock clockwise, and therefore the link 1255 is not moved to operate the printing hammer.

If, when the arm 1291 is released under control of the cam 1298, both fingers 1281 and 1284 enter notches in the discs 1277 and 1278, respectively, the arm 1291 is free to rock clockwise, thus lowering the link 1292 and moving the segment 1275 counter-clockwise beneath the stud 1240. Thereafter, upon rocking movement of the arm 1269, the arm 1266 is maintained against clockwise rotation, and therefore the toggle consisting of the links 1261 and 1264 is straightened to rock the arm 1260 to shift the link 1255 and the bell crank 1253 to raise the printing hammer 1246 to make an impression.

If the fingers 1281 and 1284 enter deep notches such as those shown in positions 4 and 8 of the notched disc 1277 and in position 10 in the disc 1278, means presently described controls the segment 1275 to remain under the stud 1240 during both the clockwise movement and the counter-clockwise movement of the cam arm 1269, and therefore two impressions are made, one during the clockwise movement of the arm 1269 and the other during its counter-clockwise movement.

After the two impressions have been made, the cam 1298, coacting with the roller 1297, restores the cam arm 1296, the shaft 1290, and the arm 1295 counter-clockwise to their home positions. During this movement, the arm 1295, engaging the stud 1294, restores the arm 1291, the link 1292, and the segment 1275 to their home positions.

In operations of the machine when the fingers 1281 and 1284 enter the shallow notches of the discs 1277 and 1278, respectively, or when one of the fingers 1281 or 1284 enters a deep notch and the other enters a shallow notch, the feeler link 1283 and therefore the arm 1291 are not moved as great an extent as when these fingers both enter deep notches. When this condition exists and the cam arm 1296 is rocked clockwise to rock the arm 1295 likewise, the arm 1291 and the link 1292 are moved an extent less than when both fingers enter deep notches. Upon continued movement of the arm 1295, after the link 1292 is arrested, a surface 1300 of the arm 1295 (Fig. 20) is moved beyond a stud 1301 of a pawl 1302 pivotally mounted on a stud 1303, which forms a pivot point between the arm 1291 and the link 1292. A spring 1304, stretched between the stud 1301 and the stud 1294, normally tends to rock the pawl 1302 clockwise. Therefore, when the surface 1300 moves beyond the stud 1301, the spring 1304 rocks the pawl 1302 clockwise to follow the inclined surface 1305 of the arm 1295. This clockwise movement of the pawl 1302 positions its end 1306 into the path of a finger 1351 of a cam arm 1350, pivoted on the shaft 1290, the latter having a roller 1349 held in engagement with a cam 1348 (Figs. 19 and 20), on the main cam shaft 229, by a spring 1352. The cam 1348 permits the arm 1350 to rock first clockwise under the influence of the spring 1352 (Fig. 20) and then back to home position. When the cam 1348 restores the cam arm 1350 to its home position, the finger 1351 engages the end 1306 of the pawl 1302 and moves the pawl 1302, together with the link 1292, upwardly. This movement takes place prior to the time the cam arm 1269 receives its counter-clockwise movement, and therefore, when the link 1292 is moved upwardly by the finger 1351, the segment 1275 is withdrawn from beneath the stud 1240. Therefore the second impression does not take place.

When the feeling fingers 1281 and 1284 enter the deep notches, the link 1292 partakes of the entire movement of the arm 1295, and therefore the surface 1300 is never withdrawn from contact with the stud 1301, and the end 1306 of the finger pawl 1302 remains out of the path of the finger 1351. During the restoring movement of the arm 1350, the finger 1351 does not contact the end 1306 of the pawl 1302, and therefore the link 1292 is restored to its home position after the second impression has been made, in the manner described above.

As shown in Figs. 17 and 19, the discs 1277 and 1278 are notched, so that, if a Deposit key is depressed in the second transaction bank and no key is depressed in the first transaction bank, a deep notch is positioned in the path of the finger 1281, as shown by positions 4 and 8 of Fig. 17 and position 10 of Fig. 19, and therefore, on any deposit entry in the machine, two impressions are made to print on the duplicate deposit slips. If one of the miscellaneous keys or one of the cash-in keys is depressed in the second transaction bank and no key is depressed in the first transaction bank, one of the shallow notches of positions 1, 3, 5, or 7 is positioned in the path of the finger 1281, and a deep notch is in the position of the finger 1284, and therefore only one impression will be made. If a repeat key in position 5 of the first transaction bank is depressed, the shallow notch shown in position 5 (Fig. 19) is presented to the finger 1284, and a notch corresponding to whichever key is depressed in the second bank will be positoned in the path of the finger 1281. In this operation, the shallow notch in position 5 of the disc 1278 controls the printing mechanism to make one impression. Therefore, one all repeat operations, only one impression is made by the printing hammer, even though a deep notch may be presented to the finger 1281. This is so because a shallow notch always takes precedence in its control over a deep notch presented to the finger 1281 or 1284.

The adjustable block 1285 is provided so that, if the system being used requires a different printing control, such different printing control can be obtained by simply rotating a block 1285 on the stud 1282 to move the finger 1281 out of effective position with respect to the disc 1277 and moving a finger 1308 on the block 1285 to effect a position in respect to a third disc 1309 (Fig. 18). As illustrated in Fig. 18, all of the notches shown are deep notches. That is to say, a deep notch is provided in each of the positions 1, 3, 4, 5, 7, and 8. Under this adjustment of the block 1285, the finger 1308, always engaging a deep notch, will cause two impressions to be made during every printing operation when no key is depressed in the first transaction bank, whereby a deep notch is also presented to the finger 1294. With the block 1285 moved to the position to be controlled by the disc 1309 and a Repeat key depressed in the first transaction bank, a shallow notch in position 5 is moved into the path of a finger 1284, and therefore only one impression will be made even though a deep notch is presented to the finger 1308 in the manner described above.

The novel arrangement whereby the feeling finger 1281 or 1308 can be manually adjusted, to be controlled by their respective notched discs, forms a simple and effective way of changing the printing control whenever it is desired to change the control over the printing hammer. It is to be understood that the notching of the discs as shown in Figs. 17, 18, and 19 are only examples for controlling the printing hammer to fit the particular system described herein. These discs may be notched in any desired manner so that the printing control may be effected to fit any system in which the machine is to be used.

Slip feeling mechanism

A slip feeling mechanism is provided in the machine so as to disable the printing hammer if no slip is placed on the slip table 1243 (Fig. 16), to prevent idle operation of the printing hammer and prevent smudging the printing platen.

The slip feeling mechanism includes a feeler 1315 (Figs. 12 and 16), which is arranged to enter an opening 1316 of the slip table 1243 to feel for the presence of a slip. If no slip is on the table and the machine is operated, the slip feeler 1315 is raised to thereby present an obstruction in the path of the link 1292 (Figs. 15 and 19) to prevent the segment 1275 from moving beneath the stud 1240, so that the toggle links 1261 and 1264 will not actuate the arm 1260, the link 1255, and the hammer 1246.

The feeler 1315 (Fig. 16) is guided in its upward and downward movements by the beforementioned shaft 1254 and a shaft 1317, carried by the frames 181 and 192. The lower end of the slip feeler 1315 is pivoted to a bell crank 1318, secured on a shaft 1319, carried by the frames 181 and 192. The lower arm of the bell crank 1318 has connected thereto a spring 1320, the other end of which is secured to a stud 1321 on the frame 192. Also secured on the shaft 1319 is an arm 1322, to which is pivoted a link 1323 at one end, the other end of the link being connected to an arm 1324 pivoted on the shaft 1325 (see also Fig. 13), carried by the frame 180, 181, 192, and 193. The arm 1324 is provided with a finger 1326, which is normally held against a finger 1327 (Fig. 16) of a pawl 1328, pivoted on a flange 1327 of a cam follower arm 1330, by the a stud 1329 of a cam follower arm 1330, by the spring 1320. The flange 1327, therefore, provides a means for locating the feeler finger 1315 in respect to the slip table 1243. The cam arm 1330 is pivoted on the shaft 1325 and is provided with an anti-friction roller 1331, held in engagement with a cam 1332 on the printer cam shaft 1273 by a spring 1333 stretched between a stud on the arm 1330 and a stud on a segment 1334 secured to the shaft 1276.

Also secured to the shaft 1276 is a segment 1335 (Fig. 15), located in respect to a flange 1336 on the link 1292, so that, upon the segment 1335 being rocked counterclockwise, the segment moves beneath the flange 1336 and prevents downward movement of the link 1292. The segment 1334 is integral with an arm 1337 (Fig. 14), the arm 1337 being provided with a stud 1338, which projects into a notch in an arm 1339, pivotally mounted on the shaft 1325. The arm 1339 is integral with a segment 1340, the outer periphery 1341 of which is slightly lower than the periphery 1342 of the arm 1324 (Fig. 13).

When the printer cam shaft 1273 is rotated counter-clockwise (Fig. 16), the spring 1333 rocks the cam arm 1330 counter-clockwise to carry the pawl 1328 and its flange 1327 away from the finger 1326 of the arm 1324. Movement of the flange 1327 away from the finger 1326 releases the arm 1324 and the link 1323 to the action of the spring 1320, rocking the bell crank 1318 counter-clockwise to raise the feeler 1315 to feel for a slip in the machine. If no slip is present on the slip table 1243, the slip feeler 1315 is permitted to rise, and therefore the spring 1320 moves the link 1323 to the right (Fig. 16) to cause the finger 1326 to follow the flange 1327. Counter-clockwise movement of the cam follower arm 1330 to its fullest extent moves the flange 1327 beyond a surface 1343 (Fig. 14), whereupon the flange 1327 drops behind the surface 1343. This movement is permitted by a notch 1344 in the arm 1324 and is effected by a spring 1345 stretched between a stud on the pawl 1328 and the cam arm 1330. When the flange 1327 is in the notch 1344 and behind the surface 1343 of the segment 1340, and the cam arm 1330 is restored to its home position by the cam 1332, the pawl 1328 rocks the segment 1340 clockwise, thus rocking the arm 1337 and the shaft 1276 counter-clockwise (Figs. 14, 15, and 16). Counter-clockwise movement of the shaft 1276 moves the segment 1335 (Fig. 15) beneath the flange 1336 to prevent downward movement of the link 1292, which prevents operation of the printing hammer.

If a slip is present on the slip table 1243, then, when the slip feeler 1315 begins to rise, the feeler is arrested by coming into contact with the inserted slip, and therefore the feeler 1315, the bell crank 1318, the shaft 1319, the link 1323, and the arm 1324 are arrested. Therefore, when the cam arm 1330 is rocked counter-clockwise, the flange 1327 of the pawl 1328 rides on the periphery 1342 of the segment 1324, therefore the flange 1327 cannot drop into the path of the surface 1343 of the segment 1340. If the flange 1327 cannot drop into the path of the surface 1343, the flange 1327 is held out of the path of the surface 1343 of the segment 1340, and therefore, upon return movement of the cam arm 1330, the flange of the pawl 1328 does not rock the segment 1340, which results in the shaft 1276 being held stationary, and the segment 1335 (Fig. 15) is held out of the path of the flange 1336 of the link 1292. Therefore, when a slip is on the slip table 1243, the link 1292 is free to operate to control the operation of the printing hammer, in a manner described hereinbefore.

Slip feed tension rollers

In order to space the printed data on the deposit slips (Fig. 22) so that the two impressions can be made, one for each copy thereof, mechanism is provided for feeding the deposit slip between the two impressions. The feed rollers are normally separated so that the deposit slip, or the teller's cash ticket, can be easily inserted into the machine. Immediately after the machine begins to operate, the feed rollers are brought together to grip the inserted slip, not only during the feeding movements but also at the time the printing takes place, to maintain the inserted slip in proper position.

The mechanism for controlling the tension rollers is shown in Fig. 29. Two upper feed rollers 1355 are rotatably mounted on the stationary shaft 204. Two tension rollers 1356 (Figs. 28 and 29) are provided, which are movable to come into contact with the stationary rollers 1355 immediately the machine begins to operate. The tension feed rollers 1356 are coupled together by a sleeve 1357 and are rotatably mounted on a shaft 1358 carried by two arms 1359 securely mounted on the beforesaid shaft 1317. Also secured on the shaft 1317 is an arm 1360 (Fig. 29), which is connected to a cam arm 1361 by a link 1362. The cam arm 1361 is provided with an anti-friction roller 1363, held in engagement with a cam 1364, secured to the hub of the beforementioned cam 1332, whereby the cam is secured to the printer cam shaft 1273. A spring 1365, connected at one end to one of the arms 1359 and at the other end to a stud on the frame 181, normally maintains the roller 1363 in contact with the periphery of the cam 1364. When the cam 1364 is in its home position, as shown in Fig. 29, the tension roller 1356 is in its lower position and out of contact with the stationary feed rollers 1355, thus clearing the opening for inserting the slip into proper position for receiving the impression.

Immediately upon the beginning of the operation of the machine, the cam 1364 rotates counter-clockwise, thus permitting the spring 1365 to rock the cam arm 1361 clockwise, which movement, through the link 1362 and the arm 1360, transmits similar clockwise rotation to the shaft 1317, thus raising the roller-supporting arms 1359 to bring the tension rollers 1356 into contact with the inserted slip and pressing it against the stationary feed rollers 1355. Near the end of the machine operation, after all impressions have been made, the cam 1364 rocks the cam arm 1361 counter-clockwise to restore the tension feed rollers 1356 to their normal positions, shown in Fig. 29.

Slip feed mechanism

After the tension rollers 1356 are rocked to their upper positions by the cam 1364 and the connecting mechanism therebetween, and after the first impression has been made upon the deposit slip, the tension rollers 1356 are given a counter-clockwise rotation to feed the slip an extent sufficient to present the next printing line to the printing position.

Means, to be presently described, is provided in the machine and can be manually set to vary the extent of the feeding of the insertable slip in accordance with a particular form being used in the machine. This variable feed provides a convenient means to adapt the machine to whatever form a bank or other business institution may want to adopt.

The mechanism for feeding the insertable slip is normally ineffective to rotate the feed rollers 1356 but is controlled from the keys of the first and second transaction banks, so that the feed mechanism will be operative during the machine operation in which a printing takes place. If the printing mechanism is automatically thrown off in the manner described hereinbefore, the feed mechanism is also thrown off. On the other hand, if the printing mechanism is thrown on to effect a print, the feed mechanism also is thrown on, so that the slip will be fed to space the two printed records.

Secured to one end of the shaft 1358 (Figs. 26 and 28) is a pinion 1370 to mesh with a rack 1371. The rack 1371 is connected to a lever 1372 by a link 1373. The lever 1372 is pivoted on a stud 1374 mounted on the side frame 181 and is provided with a stud 1375 at its lower end, normally held against the end of a pusher slide 1376 by a spring 1377. The pusher slide 1376 is slotted to slide on a guide stud 1378 mounted on the side frame 181. Pivoted at the rear end of the pusher slide 1376 is a cam arm 1379 pivoted on the beforementioned shaft 1325. The cam arm 1379 is provided with an anti-friction roller 1380, held in engagement with the periphery of a cam 1381, secured to the printer cam shaft 1273, by the spring 1377.

The pusher slide is provided with a stud 1382, which is normally engaged by a lateral extension 1383 of a vertically-movable pitman 1384. The pitman 1384 is controlled in its movements by control discs differentially set under control of the transaction bank of keys, in a manner to be described hereinafter, so that, when no feed is required, the extension 1383 remains in the path of the stud 1382, and, when a feed is required, the vertical extension 1383 is lowered out of the path of the stud 1382.

If the extension 1383 is out of the path of the stud 1382 and the printer cam shaft 1273 rotates counter-clockwise, the spring 1377, acting through the lever 1372, the stud 1375, and the pusher slide 1376, causes the roller 1380 to follow the contour of the cam 1381 and thereby rock the cam arm 1379 counter-clockwise. Counter-clockwise movement of the cam arm 1379 moves the pusher slide 1376 to the right (Fig. 26), and the spring 1377 moves the link 1373 to the left, thus moving the rack 1371 to the left to rotate the pinion 1370 clockwise. Clockwise movement of the pinion 1370 rotates the shaft 1358 likewise. However, at this time, the shaft 1358 is uncoupled from the feed rollers 1356, and therefore the feed rollers are not rotated. Upon further rotation of the cam 1381, its contour rocks the cam arm 1379 clockwise, thus moving the pusher slide 1376 to the left (Fig. 26), and, through the lever 1372, moves the link 1373 and the rack 1371 to the right, thus rotating the pinion 1370 and the shaft 1358 counter-clockwise. During the counter-clockwise rotation of the shaft 1358, a clutch between the shaft 1358 and the feed rollers 1356 is effective, as will be described hereinafter, to rotate the feed rollers 1356 to space the inserted slip to receive the second impression.

The extent of feeding movement to be given to the inserted slip is controlled by a plate 1385, rotatably mounted on the shaft 1276. The plate 1385 is provided with a plurality of steps 1386 of varying distances from its pivot point. Any of the steps 1386 may be brought into the path of the stud 1382 by removing a screw 1387, which is screwed into the side frame 181 of the machine. Upon removal of the screw 1387, the plate 1385 can be manually positioned in any of its disclosed positions, and, upon reinsertion of the screw 1387, the plate 1385 is held in the desired position. When the pusher slide 1376 is released for movement to the right (Fig. 26) by the contour of the cam 1381, the stud 1382 thereon comes into contact with the step 1386 in its path. The movement given to the slide 1376 is determined by the space between the stud 1382 and the selected step 1386. In the machine used to illustrate the present invention, the steps 1386 are so arranged that the distance between prints on the insertable slip can be varied from .6" to 2" in steps of .2". These dimensions are illustrative only, and any desired dimensions may be used in building the machine.

The clutch arrangement between the shaft 1358 and the feed rollers 1356 is illustrated in enlarged scale in Fig. 30. Secured to the shaft 1358 is a disc 1390 (see also Fig. 28), having a divided cylindrical portion 1391, which projects inwardly into the inner diameter of a ratchet ring 1392. Slidably mounted in the runways provided in the cylindrical portion 1391 are a pair of one-way drive pawls 1393, which are forced into teeth of a ratchet ring by a spring 1394. The spring 1394 passes through an opening drilled through the shaft 1358, so that the pawls 1393 may be forced outwardly to engage the inner ratchet teeth of the ring 1392. The ratchet ring 1392 is secured to one of the feed rollers 1356 by two studs 1395.

When the shaft 1358 receives its clockwise rotation at the beginning of the operation of the feed mechanism, the feed pawls 1393, camming against the ratchet teeth, are both moved inwardly to disconnect the driving connection between the shaft 1358 and the feed roller 1356. A brake mechanism, described hereinafter, prevents accidental rotation of the feed rollers 1356 during this operation. Upon the counter-clockwise rotation of the shaft 1358, the pawls 1393 form a driving connection between the cylinder 1391 and the ratchet ring 1392, thus rotating the feed rollers 1356 counter-clockwise to feed the inserted slip from one printing position to the other.

The clutch mechanism shown in Fig. 30 is provided in only one of the feed rollers 1356. However, inasmuch as the two feed rollers are connected together by the sleeve 1357 in the manner hereinbefore described, both feed rollers partake of the rotating movement.

The brake mechanism for the feed roller 1356, mentioned hereinbefore, consists of a spring-actuated brake 1396 (Fig. 26), which has a formed end normally held in engagement with one feed roller 1356 by a spring 1397. The brake member 1396 is pivoted on a stud 1398 on an extension of one of the tension arms 1359.

If, when the shaft 1358 receives its initial or clockwise rotation, the feed roller 1356 should tend to be moved clockwise by the clutch pawls 1393, the coaction between the periphery of the feed roller 1356 and the formed end of the brake member 1396 is such that the roller 1356 is wedged against the brake member 1396, and rotation thereof is prevented. The reason for this wedging action is that the point of contact of the formed member of the brake member 1396 is below center of the line drawn between the pivot point of the brake member 1396 and the shaft 1358. Clockwise rotation of the feed roller 1356, therefore, has a tendency to rock the brake member 1396 counter-clockwise, thus causing a wedging action, which prevents such rotation of the feed roller 1356.

As disclosed in Fig. 23, each of the feed rollers 1356 is provided with a surface of resilient material such as rubber, to effect a better gripping action therebetween and the stationary rollers 1355.

Means is also provided on the shaft 1358 to prevent any excess rotation of the feed rollers 1356 at the end of a feeding operation. This lock includes the cam member 1400 (Fig. 27) secured on the end of the shaft 1358. Normally—that is, when the machine is at rest—the cam 1400 lies in the path of a pawl 1401 connected to a second pawl 1402 by a stud 1403 and holds the pawl 1402 in contact with a ratchet wheel 1404 coupled to the right-hand feed roller 1356. As long as the cam 1400 blocks movement of the pawl 1401, the pawl 1402 is locked in engagement with the teeth of the ratchet wheel 1404, thus preventing any rotation of the feed rollers 1356. However, upon initial clockwise rotation of the shaft 1358, after the feed rollers have been raised into feeding position, the cam 1400 moves away from the pawl 1401, thus permitting a spring 1405, connected to the pawl 1402 at one end and to a stud on one of the arms 1359 at its other end, to withdraw the nose of the pawl 1402 from engagement with the ratchet wheel 1404, thus freeing the rollers 1356 to the action of the feeding mechanism hereinbefore described.

*Automatic slip feed control disc*

The position of the pitman 1384 and its lateral extension 1383 is automatically controlled by notched discs 1410 and 1411 (Figs. 24 and 26). The disc 1410 is provided with internal teeth rotatably mounted on a disc 1412, carried by the shaft 632. The internal teeth of the disc 1410 are in engagement with a pinion 1413 mounted on the beforementioned shaft 763, which is adjusted under control of the second transaction bank in the manner hereinbefore described.

The disc 1411 (Fig. 26) is provided with internal teeth which rotate on a disc 1414, rotatably mounted on the shaft 632. The internal teeth of the disc 1411 mesh with a pinion 1415 carried by the shaft 743, which is differentially positioned under control of the first transaction bank in a manner hereinbefore described.

A feeling finger 1416 is provided to engage the periphery of, or a notch in, the disc 1410, and a feeling finger 1417 is provided to engage the periphery of, or a notch in, the disc 1411. The finger 1416 is integral with an adjustable block 1418 rotatably mounted on a stud 1419 carried by a slide 1420, the forward end of which slide has the finger 1417 formed thereon. A spring plate 1421, carried by studs 1422 on the slide 1420, provides means for holding the block 1418 in its adjusted position. The slide 1420 is slotted to slide on the beforementioned stud 1268. The beforementioned spring 1299 having one end connected to the stud 1298 and the other end to the pivot stud for the slide 1420, said pivot stud provides a connection between the slide 1420 and the beforementioned yoke 1423, rotatably mounted on the shaft 1290. The yoke 1423 has one arm 1424 projecting to the right (Fig. 26), carrying the stud 1425, normally held against the beforementioned arm 1296 by the spring 1299. The yoke 1423 is provided with a second arm 1426, to which the upper end of the beforementioned pitman 1384 is pivoted.

When the cam 1298 rocks clockwise, as described hereinbefore, to permit the arm 1296 to move clockwise, the stud 1425 and the yoke 1423 are released to the action of the spring 1299, whereupon the slide 1420 tends to move leftwardly (Fig. 26) to bring the feeling fingers 1416 and 1417 into contact with the peripheries or notches of the discs 1410 and 1411. If the Deposit key has been depressed prior to the operation of the machine, the second transaction bank differential, acting through the square shaft 763 and the pinion 1413, adjusts the disc 1410 to present either the notch 4 or the notch 8 (Fig. 24) into the path of the finger 1416. During a deposit transaction entry operation, no key is depressed in the first transaction bank, and therefore a notch 10 is in the path of the finger 1417. During such an operation, both fingers 1416 and 1417 are permitted to enter notches in their associated discs 1410 and 1411, and therefore the yoke 1423 is rocked clockwise to lower the pitman 1384 and thereby to remove the lateral extension 1383 from the path of the stud 1382, which, as described hereinbefore, results in a feeding movement of the feed rollers 1356.

If any of the keys in the second transaction bank other than a Deposit key is depressed, then an unnotched portion of the disc 1410 is in the path of the finger 1416. During this operation, when the yoke 1423 is released by the cam 1298, the slide 1420 is immediately arrested due to the finger 1416 coming into contact with the periphery of the disc 1410. During this operation, the yoke 1423 is not permitted to move, and therefore the pitman 1384 remains in the position shown in Fig. 26, wherein the lateral extension 1383 remains in the path of the stud 1382. During this operation of the machine, the pusher slide 1376 cannot move, and therefore the feed rollers 1356 are not rotated.

If it is desired to change the control of the feed mechanism for an inserted slip for any reason, the block 1418 can be rotated on its stud 1419 manually to move a feeler 1427 thereon into effective position to coact with a notched disc 1428 (Fig. 25), and simultaneously the finger 1416 is removed from coacting position with the notched disc 1410. With this setting, the disc 1428, being notched differently from the disc 1410, will control the effectiveness of the slip feeding mechanism in accordance with any different system. The notching shown in Fig. 25 is illustrative only and can be arranged in any desired manner.

As illustrated, the disc 1428 is adjusted under control of the second transaction bank in the same manner as described for the adjustment of the notched disc 1410.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, in combination with type carriers, printing means to take impressions from the type carriers onto record material, power-operated means to actuate the printing means, said power-operated means including a toggle connection which may be operated to actuate the printing means to take one or two impressions on the record material during an operation of the machine, and an adjustable stop means to control the operation of the toggle connection to take said one or two impressions, of control discs having notches of different depths; a spring-actuated feeler means coacting with the notches whereby the feeler is controlled to move different extents; connections between the feeler and the stop means whereby the stop means is moved into position to be engaged by the toggle connection to cause the toggle connection to actuate the printing means when the power means operates; a first cam means to release the feeler means and the stop means, and to restore the feeler means and the stop means to original position after the printing means has taken two impressions; a second cam means to restore the feeling means and the stop means to original position after the printing means has taken one impression, said second cam means being normally disengaged from the feeler means; an adjustable member mounted on one element of the connections and movable therewith an extent controlled by the extent of movement of the feeler means under control of the notches in said control discs; control means to control the adjustment of the adjustable member whereby the adjustable member is held out of engagement with said second cam means when the feeler means moves one extent and the adjustable member is moved into engagement with the second cam means when the feeler means moves another extent to cause the second cam means to restore the feeler means, and through the connections restore the stop means to ineffective position after one impression has been taken; and means to feed the record material after the first impression has been taken.

2. In a machine of the class described, in combination with type carriers, printing means to take impressions from the type carriers onto record material, power-operated means to actuate the printing means, said power-operated means including a toggle connection which may be operated to actuate the printing means to take one or two impressions on the record material during each operation of the machine, and an adjustable stop means to control the operation of the toggle connection to take one or two impressions, of control discs having notches of different depths; a spring-actuated feeler means coacting with the notches whereby the feeler means is controlled to move different extents; connections between the feeler means and the stop means whereby the stop means is moved from a normal position into an effective position under control of said notches; an adjustable member mounted on one element of said connections; a first power-operated means to release said feeler means and connections to enable the feeler means and connections to be adjusted under control of said notches in the control plates and to thereafter restore the feeler means and connections to normal position; a second power-operated means; cam means movable with the first power-operated means to control the adjustment of the adjustable member, said cam means effective to maintain the adjustable member against movement when the feeler is arrested by a shallow notch in said discs and to release said adjustable member to move into the path of movement of said second power-operated means when the feeler means is adjusted under control of deep notches in said discs whereby the second power-operated means may restore the feeler means, the connections, and the stop to normal positions, said second power-operated means timed to operate to restore the feeler means, the connections, and the stop means to normal position after one impression has been made on the record material; and feeding means to feed the record material before the second impression has been taken.

3. In a machine of the class described, in combination with type carriers, printing means to take impressions from the type carriers onto record material, power-operated means to actuate the printing means, said power-operated means including a toggle connection which may be operated to actuate the printing means to take one or two impressions onto record material during an operation of the machine, and an adjustable stop means to control the operation of the toggle connection to take said one or two impressions, of control discs having shallow and deep notches; a spring-actuated feeler means coacting with the notches whereby the feeler is controlled to move different extents; means to connect the feeler means to the stop means, including an arm; a projection on said arm; a first cam-controlled member engaging said projection to normally restrain the feeler means in a retracted position, said first cam-controlled means operable to release the feeler means prior to a printing operation and to restore said feeler means after a second printing operation; a pivoted coupling device mounted on said arm; a second cam-controlled member; a spring normally biasing said pivoted coupling member to move into engagement with said second cam-operated member, said first cam-operated member normally restraining the coupling member out of engagement with the second cam-operated member; a surface on said first cam-controlled member coacting with the coupling device to maintain the coupling device out of engagement with the second cam-controlled member when the arm is moved one extent under control of the feeler means and to release the coupling device to move into engagement with the second cam-controlled device when the arm is moved another extent under control of the feeler means, said second cam-controlled means operating to restore the arm and the feeler means after one impression has been made by the printing means to thereby control the setting of the stop means for causing one or two impressions to be made by the printing means and feeding means to feed the record material before a second impression has been taken.

4. In a machine of the class described, in combination with type carriers, printing means to take impressions from the type carriers onto record material, and power-operated means to actuate the printing means, said power-operated means including a toggle connection, of a settable means movable from a normal position into a moved position wherein the settable means arrests one element of the toggle connection to render the toggle connection effective to cause the impression means to be actuated by the power-operated means; differentially settable control disks having a plurality of control points thereon, said control points located at different distances from the axis of the control disks; feeler means connected to the settable means, said feeler means coacting with the control point to move different extents from the normal position, depending on the differential setting of the control disks, to control the setting of the settable means; means responsive to one setting of the feeler means to restore the feeler means and the settable means to normal position after one impression has been taken by the impression means; another means responsive to a different setting of the feeler means to restore the feeler means and the settable means to normal position after a second impression has been taken by the impression means; said two last-named means thereby acting to control the effectiveness of said toggle joint to cause the printing means to take one or two impressions; manipulative devices to control the differential setting of the control disks; and means to feed the record material between the two printing operations.

5. In a machine of the class described, in combination with type carriers, printing means to take impressions from the type carriers onto record material, and power-operated means to actuate the printing means, said power-operated means including a toggle connection, of differentially settable control disks having a plurality of control points, said control points located at different distances from the center of the disks; a feeler means coacting with the control points so as to move different extents from a normal position, depending upon the location of the control points; resilient means to actuate the feeler means; a cam to release the feeler means to the action of the resilient means; a blocking means connected to the feeler means and movable from a normal position into the path of movement of one element of said toggle connection to control the effectiveness of the toggle connection; a plurality of means to restore said blocking means and feeler means to normal position, one of said plurality of means being effective to restore said blocking means after one impression is made by the printing means, and the other one of said plurality of means being effective to restore said blocking means after a second impression has been made by the printing means; means controlled by the setting of the feeler means under control of the control points to determine which one of said plurality of means is to be effective to withdraw said blocking means; manipulative devices to control the differential setting of the control disk; and means to space the record material after the first one of said impressions has been made on the record material.

6. In a machine of the class described, in combination with type carriers, printing means to take impressions from the type carriers onto record material, and power-operated means to actuate the printing means, said power-operated means including a toggle connection, of differentially settable control disks having a plurality of control points, said control points located at different distances from the center of the disks; a feeler mechanism coacting with the control points so as to be set in different positions out of normal position, depending upon the location of the control points; resilient means to actuate the feeler means; a cam to release the feeler means to the action of the resilient means; a blocking means connected to the feeler means and movable from a normal position into the path of movement of one element of said toggle connection to control the effectiveness of the toggle connection; a plurality of means to restore said blocking means and feeler means to normal position, one of said plurality of means being operable after one impression is made by the printing means and the other one of said plurality of means being effective to restore said blocking means after a second impression has been made by the printing means, the effectiveness of said plurality of means being controlled by the position of the feeler means out of normal position as set under control of the control points on the disks; manipulative devices to control the differential setting of the control disks; and means to feed the record material after the first impression has been made.

7. In a machine of the class described, in combination with type carriers, printing means to take impressions from the type carriers onto record material, and power-operated means to actuate the printing means, said power-operated means including a toggle connection, of differentially settable control disks having a plurality of control points, said control points located at different distances from the center of the control disks; a feeler means coacting with the control disk so as to move different extents out of normal position and thereby be set in different positions depending upon the location of the control points; resilient means to actuate the feeler means; a cam to release the feeler means to the actuation of the resilient means; a blocking means connected to the feeler means and movable from a normal position to the path of movement of one element of the toggle connection to control the effectiveness of the toggle connection; a first cam means timed to restore the blocking means to normal position out of the path of movement of said one element of the toggle means after the second impression has been made by the printing means; a second cam means to restore the blocking means to normal position out of the path of movement of said one element of the blocking means after the first impression has been made onto the record material by the printing means; means controlled by the feeler means, responsive to the position of the feeler means out of normal position to determine which cam means is to be effective; manipulative devices to control the differential setting of the control disks; and feeding means to feed the record material to space the printed records on the record material.

8. In a machine of the class described, in combination with type carriers, printing means to take impressions from the type carriers onto record material, and power-operated means to actuate the printing means, said power-operated means including a toggle connection, of differentially settable control disks having the control points located at different distances from the center of the control disks; a feeler means coacting with the control points so as to be set at different positions from a normal position, depending upon the location of the control points; resilient means to actuate the feeler means; a cam to release the feeler means to the action of the resilient means; a blocking means connected to the feeler means and movable from a normal position into the path of movement of one element of said toggle connection to control the effectiveness of the toggle connection; a first cam means normally effective to restore the blocking means to normal position out of the path of said one element of the toggle means after the second impression has been made by the printing means; a second cam means normally ineffective to restore the blocking means from the path of movement of said one element of the toggle means; means positioned by the feeler means when moved one extent under control of the control points to render the second cam means effective to restore the blocking means from the path of movement of said one element of the toggle connection after the first impression has been made to render the printing means inactive to take a second impression; manipulative devices to control the differential setting of the control disks; and means to feed the record material after the first impression has been made thereon.

MAYO A. GOODBAR.
EVERETT H. PLACKE.
CARL G. FALKNER.

References Cited in the file of this patent

UNITED STATES PATENTS

| Number | Name | Date |
| --- | --- | --- |
| 2,081,836 | Racz | May 25, 1937 |
| 2,139,719 | Breitling | Dec. 13, 1938 |
| 2,187,200 | Green | Jan. 16, 1940 |
| 2,339,321 | Crosman | Jan. 18, 1944 |
| 2,351,541 | Placke | June 13, 1944 |
| 2,373,510 | Spurlino | Apr. 10, 1945 |
| 2,467,704 | Spurlino | Apr. 19, 1949 |